Figure 1:
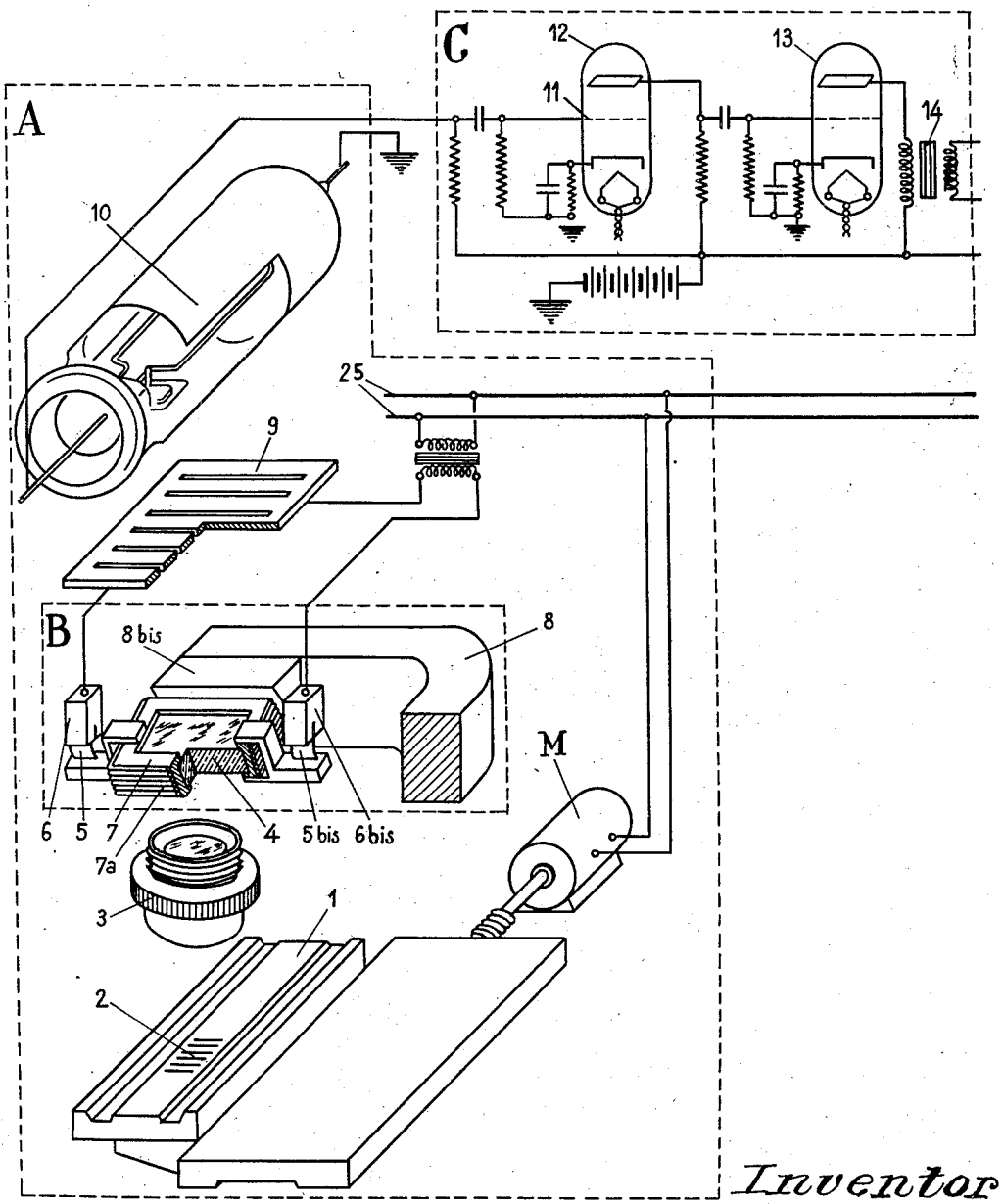

May 8, 1945.   M. KOULICOVITCH   2,375,665
ELECTRIC DEVICE FOR SIGNALING THE POSITION OF A MOVABLE MARK
Filed Sept. 24, 1942   2 Sheets-Sheet 1

Inventor
M. Koulicovitch
By Glascock Downing & Seebold
Attys.

May 8, 1945.  M. KOULICOVITCH  2,375,665
ELECTRIC DEVICE FOR SIGNALING THE POSITION OF A MOVABLE MARK
Filed Sept. 24, 1942  2 Sheets-Sheet 2
Fig. 1A
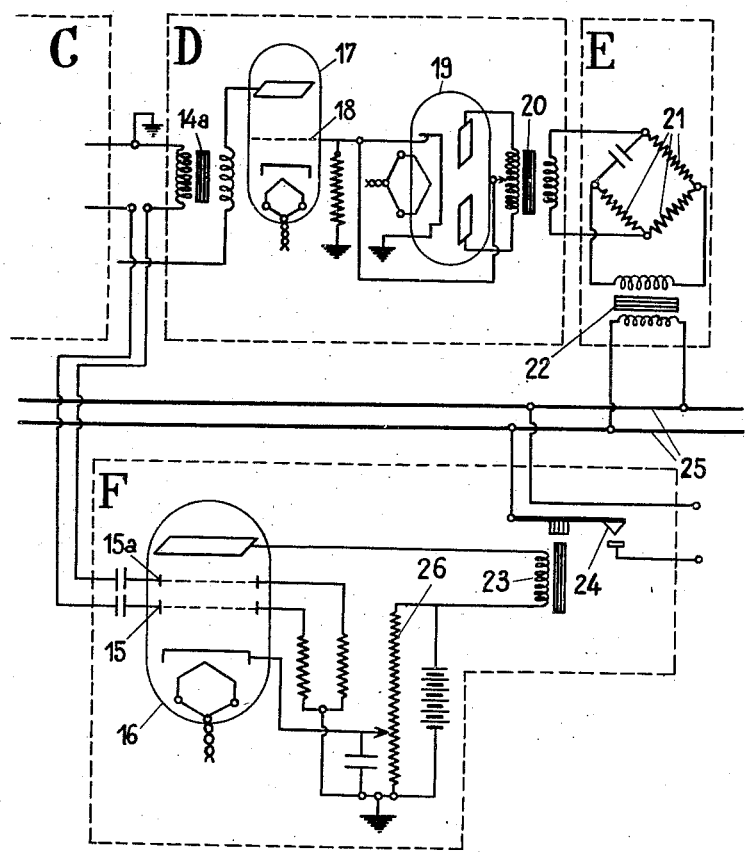
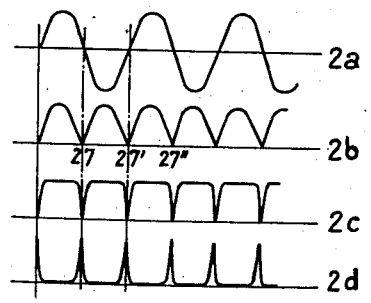
Fig. 2
Inventor
M. Koulicovitch
By Glascock Downing v Seebold
Attys Patented May 8, 1945

2,375,665

UNITED STATES PATENT OFFICE 2,375,665

ELECTRIC DEVICE FOR SIGNALING THE POSITION OF A MOVABLE MARK

Maurice Koulicovitch, Geneva, Switzerland, assignor to Societe Genevoise d'Instruments de Physique, Geneva, Switzerland, a firm of Switzerland Application September 24, 1942, Serial No. 459,580 In Switzerland February 28, 1942

4 Claims. (Cl. 177—311)

The object of the present invention is an electric device for signaling the position of a movable mark, device which can be applied in particular to a machine-tool. It comprises a photo-electric sighter projecting the image of a movable mark through a grid on a photo-electric cell and a periodical deflector of the image of the mark on the grid producing periodical electric impulses emanating from the cell. This device is characterized by a generator of other periodical electric impulsed of the same frequency as those coming from the cell, by an organ permitting to retard or to advance at will the impulses of this generator in respect with those of the cell and by a signaling relay comprising two circuits, one of which is fed by the cell and the other by the impulse generator, in such a way that this relay can only react when the impulses received in these two circuits coincide in time.

Figs. 1 and 1A considered jointly illustrate diagrammatically, by way of example, an embodiment of the object of the invention. Fig. 2 illustrates the operation of this embodiment.

In this Fig. 1, A represents a photo-electric device sighting the position of a movable mark 2 of a tool-machine, for instance. B is a periodical deflector enabling to impart a continuous oscillatory movement to the image of the mark on a grid 9 placed before a photo-electric cell 10 whose reactions are reinforced by an amplifier C.

D is a generator of electric impulses of very short duration and of the same frequency as those coming out of the amplifier C. These two organs are fed by a common network that imposes to them its own frequency.

E is a phase regulator enabling to advance or to retard the phase of the impulses produced by the generator D in relation to the phase of the network.

F is an electric signaling apparatus connected in such a way to the generator D and to the amplifier C, that it only reacts when the impulses received from the amplifier C are in phase with those received from the generator D.

The detail of the above mentioned elements is as follows:

The machine-tool comprises a table carrying a rule 1 with a scale 2. This table can move under the action of a motor M. An objective 3, placed above the graduated rule, projects the image of a few divisions of the scale 2 on a grid 9, through a plane parallel glass 4 mounted in a frame 7 on which is wound an electric coil 7a. The latter is connected to the alternating current network 25, through flexible supporting blades 5 and 5' and terminals 6 and 6'; it is placed in the field of a permanent magnet 8, of whose poles, one only is represented, in 8.

The fluctuations of light coming out of the grid 9 are received by a photo-electric cell 10, whose reactions are communicated to the grid 11 of a first amplifying valve 12. In the anode circuit of the last amplifying valve 13 is inserted the primary winding of an outlet transformer 14, whose secondary circuit is connected to the grid 15 of a valve 16, which has two grids. The other grid 15a of the valve 16 is connected to the secondary of an anode transformer 14a of a valve 17, whose grid 18 is excited by a valve 19, which has two anodes fed by a transformer 20. The latter is connected to the network 25 through the intermediary of a phase regulating bridge 21 and of a transformer 22. Finally, the valve 16 feeds through its anode circuit the winding 23 of an electric signaling relay, whose movable armature carries a contact 24, which can close a utilisation circuit branched on the network 25.

The operation of this device is as follows:

Supposing that the mark 2 of the scale of the rule 1 comes near to a position in which it must be signaled. This position has been determined by a preliminary adjustment of the phase regulator 21, which permits, by adjusting the resistance 21, to vary the amount of leading or of lagging of the impulses, which are produced in the following way by the impulse generator D:

The valve 19 transforms the sine-curve tension of the network (Fig. 2a) into a rectified tension (Fig. 2b) having sharp minima in 27, 27', 27'' etc.

The valve 17 is adjusted so as to amplify exclusively the region in close proximity to these minima. The curve of the tension amplified by this valve is represented by the diagram 2c; the transformer 14a supplies at its terminals a tension represented by the curve 2d, this tension forms a succession of impulses.

One obtains by this process, for each complete period of the sine-curve tension, two points of tension as brief as one requires and whose tops coincide with the precise instant in which the initial sine-curve 2a passes through zero.

These impulses are transmitted to the grid 15a of the valve 16.

The image of the mark 2 and of the neighbouring marks is projected on the grid 9 through the oscillating deflecting glass 4, which gives it a to-and-fro motion in the rhythm of the network frequency. The coincidences of the image and of the slits of the grid, at each half-period, produce a photo-electric reaction of the cell 10, which reaction is amplified in the valves 12 and 13 and transmitted to the grid 15.

As long as the mark 2 has not reached the position to be signaled, the impulses received by the two grids of the valve 16 do not coincide in time. Now, the valve 16 has both its grids 15 and 15a polarised negatively by the resistance 26 at such a value, that, even if one of the two grids becomes positive, the valve is not opened; it is necessary that both grids become positive at the same time in order that the anode current can be established, and this only occurs in the case in which the mark 2 arrives in the position to be signaled. The anode current excites the winding 23 of the signaling relay. The latter can then control any kind of signal or, for instance, a device to stop the table.

The wiring diagram is not restricted to that of the embodiment represented. The wiring of the various elements of the generator, of the phase regulator, and of the signaling relay, could make the object of numerous alternatives remaining within the scope of the invention.

A great advantage of this signaling device is to express by a notion of time the position of the object to be observed, so that the precision of the operation is independent of the intensity of the current emitted by the cell.

I have now described the object of the invention in such a way as to make it clear for those acquainted with the art.

What is claimed to be new is:

1. An electric device for signaling the position of a machine part comprising a mark movable with the machine part, a grid, a photo-electric cell, means for producing an image of said mark, a periodical deflector for projecting the image of said mark through the grid to said cell to produce periodic electrical impulses, a generator for producing other periodic electric impulses of the same frequency as those produced by said cell, means to retard or to advance the impulses of said generator with respect to the impulses of the cell, and a signaling relay including an electric valve having two grids respectively receiving the electric impulses from the cell and generator in such manner that the relay can only react when the impulses received in the two grids coincide as to time.

2. An electric device as claimed in claim 1, characterized in that the impulse generator and the periodical deflector are connected in a common alternating current net-work.

3. An electric device as claimed in claim 1, characterized by the provision of an amplifier arranged intermediate the photo-electric cell and said relay.

4. An electric device as claimed in claim 1, characterized in that said means to retard or to advance the generator impulses is constituted by a phase-regulator.

MAURICE KOULICOVITCH.